United States Patent
Marolla et al.

(10) Patent No.: US 12,251,812 B2
(45) Date of Patent: Mar. 18, 2025

(54) MULTI-SPEED AUTOMATIC TRANSMISSION FOR A POWER TOOL

(71) Applicant: Milwaukee Electric Tool Corporation, Brookfield, WI (US)

(72) Inventors: David B. Marolla, Menomonee Falls, WI (US); Kevin Puls, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/210,695

(22) Filed: Jun. 16, 2023

(65) Prior Publication Data

US 2023/0415322 A1 Dec. 28, 2023

Related U.S. Application Data

(60) Provisional application No. 63/354,961, filed on Jun. 23, 2022.

(51) Int. Cl.
| | |
|---|---|
| *B25F 5/00* | (2006.01) |
| *B27B 17/02* | (2006.01) |
| *B27B 17/08* | (2006.01) |
| *B27B 17/10* | (2006.01) |
| *B27B 17/12* | (2006.01) |

(52) U.S. Cl.
CPC .............. *B25F 5/001* (2013.01); *B27B 17/02* (2013.01); *B27B 17/083* (2013.01); *B27B 17/10* (2013.01); *B27B 17/12* (2013.01)

(58) Field of Classification Search
CPC ....... B25F 5/001; B27B 17/02; B27B 17/083; B27B 17/10; B27B 17/12
See application file for complete search history.

(56) References Cited

U.S. PATENT DOCUMENTS

| | | | |
|---|---|---|---|
| 3,454,058 A | 7/1969 | Fritz | |
| 4,805,706 A | 2/1989 | Stone | |
| 8,172,004 B2 * | 5/2012 | Ho | B23B 45/008 |
| | | | 173/176 |
| 8,911,320 B2 * | 12/2014 | Tokunaga | B24B 47/12 |
| | | | 476/48 |

FOREIGN PATENT DOCUMENTS

| | | |
|---|---|---|
| CN | 103307143 B | 9/2013 |
| CN | 207064511 U | 3/2018 |
| CN | 210919890 U | 7/2020 |
| FR | 2517586 A1 | 6/1983 |
| JP | 2009297801 A | 12/2009 |

OTHER PUBLICATIONS

European Search Report Corresponding with Application No. EP23176128 on Nov. 3, 2023 (2 pages).

* cited by examiner

*Primary Examiner* — Nathaniel C Chukwurah
(74) *Attorney, Agent, or Firm* — Dority & Manning, P.A.

(57) ABSTRACT

Multi-speed automatic transmissions for power tools are provided. A multi-speed automatic transmission includes an output shaft configured to be coupled to a chain sprocket to rotatably drive the chain sprocket, wherein the automatic transmission is configured to automatically shift between a plurality of gear ratios in response to a rotational speed of the output shaft reaching a preset rotational speed.

20 Claims, 3 Drawing Sheets

MULTI-SPEED AUTOMATIC TRANSMISSION FOR A POWER TOOL

CROSS-REFERENCE TO RELATED APPLICATIONS

The present application claims priority to U.S. Provisional Patent Application No. 63/354,961 filed on Jun. 23, 2022, the disclosure of which is incorporated by reference herein in its entirety.

FIELD

The present disclosure relates generally to transmissions for a power tool, and more particularly to a multi-speed automatic transmission for a power tool.

BACKGROUND

Power tools are generally utilized in lieu of hand tools. Power tools can perform the same, or similar, tasks as hand tools at higher efficiency, allowing the operator controlling the power tool to use less effort in achieving a task. For example, chainsaws can cut through wood faster than traditional handsaws. Circular saws can cut through metal faster than traditional hacksaws. Vacuums can remove debris faster than traditional brooms. And so on.

Higher efficiency is typically achieved by using a motive device, such as a gas engine or electric motor to drive a working implement of the power tool. These engines and motors are generally operable at variable speeds controlled by the operator through an actuator. For example, chainsaws move a cutting chain about a guide bar at increasing speeds as the actuator is further depressed. As such, power tools typically have maximum operating speeds limited by the output rating of the motive device.

Use of linear operating speeds, i.e., speeds which have fixed profiles in view of the limitations of the motive device, may not be desirable in certain instances. For example, cutting thick logs requires high torque while cutting thin branches may be best performed at high operational speeds.

Accordingly, improved power tools which can adjust to different situations are desired in the art. In particular, power tools which provide multi-speed transmissions, and more particularly multi-speed, automatic transmissions would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a power tool is provided. The power tool can include: a working implement; a motive device coupled to a motive device shaft; and an automatic transmission disposed between the working implement and the motive device to drive the working implement when the motive device is activated, the automatic transmission comprising: a drive unit comprising: a first drive gear coupled to the motive device shaft; and a second drive gear coupled to the motive device shaft; and a driven unit comprising: an output shaft in communication with the working implement; a first driven gear in communication with the first drive gear and the output shaft; a one-way bearing coupling the first driven gear to the output shaft; a second driven gear in communication with the second drive gear and the output shaft; and a clutch selectively coupling the second driven gear to the output shaft upon the output shaft reaching a preset rotational speed, wherein a first gear ratio [$Teeth_{DRIVE1}/Teeth_{DRIVEN1}$] of the first drive gear to the first driven gear is less than a second gear ratio [$Teeth_{DRIVE2}/Teeth_{DRIVEN2}$] of the second drive gear to the second driven gear.

In accordance with another embodiment, an automatic transmission for a chainsaw is provided. The automatic transmission includes an output shaft configured to be coupled to a chain sprocket to rotatably drive the chain sprocket, wherein the automatic transmission is configured to automatically shift between a plurality of gear ratios in response to a rotational speed of the output shaft reaching a preset rotational speed.

In accordance with another embodiment, a chainsaw is provided. The chainsaw includes a guide bar; a chain disposed around the guide bar and moveable about the guide bar; a chain sprocket configured to drive the chain around the guide bar; a housing having a handle and an actuator; a motive device configured to drive the chain sprocket; and an automatic transmission disposed operatively between the motive device and the chain sprocket, the automatic transmission comprising: an output shaft coupled to the chain sprocket to rotatably drive the chain sprocket, wherein the automatic transmission is configured to automatically shift between a plurality of gear ratios in response to a rotational speed of the output shaft reaching a preset rotational speed.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
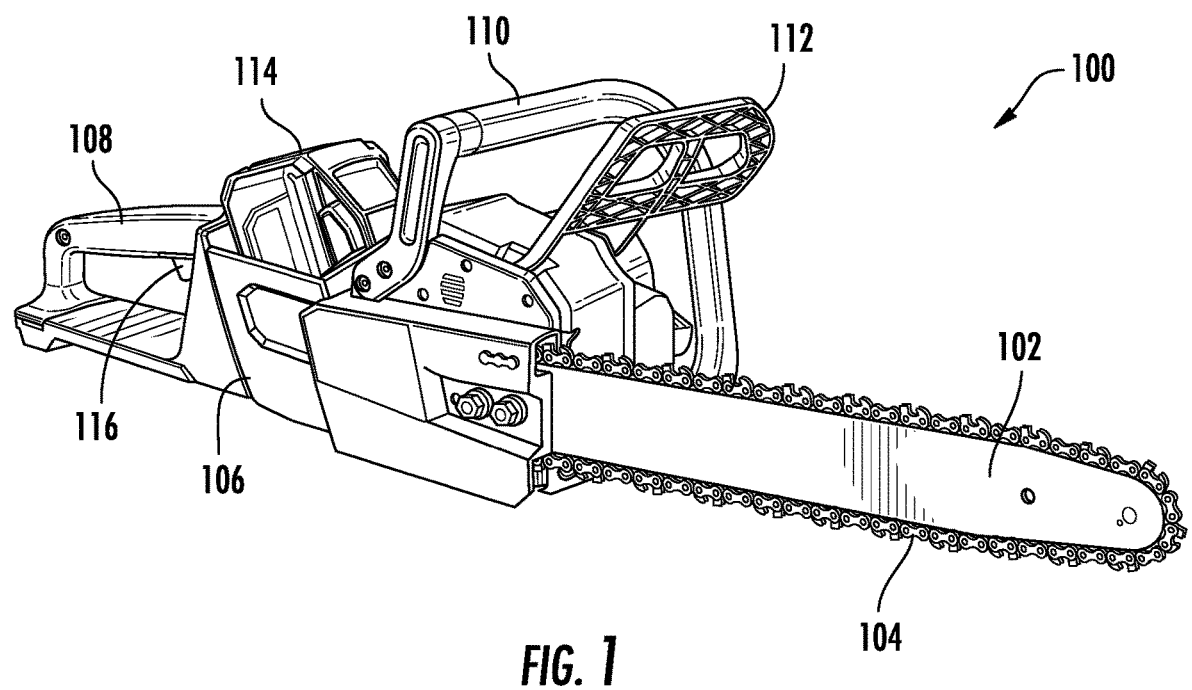
FIG. 1 is a perspective view of a chainsaw in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the term "power tool" is intended to refer to a device which is used to perform a work operation, such as cutting materials like wood, metal, concrete, grass, or the like; trimming objects like branches; biasing fluids like air and water; and the like. By way of non-limiting example, power tools can include chainsaws, circular saws, reciprocating saws, grinders, pruners, string trimmers, lawnmowers, edgers, blowers, vacuums, snow throwers, mixers, augers, pumps, pipe threaders, drills, and impact wrenches. While embodiments provided below are directed to chainsaws, one or more components of the chainsaw described below, such as the automatic transmission, may be utilized with one or more different types of power tools.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, a power tool in accordance with one or more embodiments described herein can generally include an automatic transmission configured to shift between a plurality of gear ratios, thereby allowing a working implement, such as a cutting chain, to operate at a variety of speeds and under a variety of torque conditions. In a particular embodiment, the automatic transmission can shift between different gear ratios without requiring the operator to perform any special action or activate any special setting. This can allow the operator to operate the power tool without having to take specific action to affect the gearing.

By way of non-limiting example, the power tool can be a chainsaw. The chainsaw can include a motive device and a chain. The automatic transmission can operably connect the motive device to the chain. When an output shaft of the automatic transmission is operating under a predetermined rotational speed, the automatic transmission can be in a first gearing, i.e., have a first gear ratio. When the output shaft of the automatic transmission operates at or above the predetermined rotational speed, the automatic transmission can be in a second gearing, i.e., have a second gear ratio different than the first gear ratio. The switch between the first and second gearings can take place upon occurrence of a preset condition, e.g., the output shaft exceeding the predetermined rotational speed. The automatic transmission can shift back to the first gearing upon occurrence of a preset condition, e.g., the output shaft falls below the predetermined rotational speed. In this regard, the chainsaw can automatically control one or more operational parameters to provide, e.g. ideal torque and chain speed, at different operating conditions. These and other advantages will become apparent to one of ordinary skill in the art after reading the entire disclosure.

Referring now to the drawings, FIG. 1 illustrates a power tool in accordance with an exemplary embodiment of the present disclosure. More particularly, FIG. 1 illustrates a chainsaw 100 in accordance with an embodiment of the present disclosure. The chainsaw 100 generally includes a guide bar 102 with a chain 104 movably coupled to an outer track of the guide bar 102. The chain 104 includes teeth which, when moved along the guide bar 102, cause the chain 104 to cut into material, such as logs and branches. The chainsaw 100 can further include a housing 106. The guide bar 102 can extend from the housing 106. The chainsaw 100 can include a handle 108. In certain instances, the chainsaw 100 can further include a secondary handle 110. A brake 112 can be positioned along the chainsaw 100 at a location, for example, adjacent to the second handle 110. The brake 112 can provide safety braking which prevents the chainsaw 100 from kicking back onto the operator with the chain 104 moving. Upon occurrence of kickback, the brake 112 can be activated by hitting the operator's arm, thereby causing the chain 104 to abruptly slow down.

The chainsaw 100 can further include a motive device (not illustrated), such as a gas powered engine or an electric motor, which drives a chain sprocket (not illustrated). The chain sprocket can be engaged with the chain 104 such that rotation of the chain sprocket causes the chain 104 to move relative to the guide bar 102. The motive device can be powered, for example, by a rechargeable energy source such as a battery 114, a fuel source such as gasoline, or the like. In the depicted embodiment, the chainsaw 100 includes an actuator 116. The actuator 116 is disposed proximate to the handle 108. When depressed, the actuator 116 can engage the motive device to cause the chain 104 to move. As the actuator 116 is depressed further, a speed of the motive device can increase from zero speed to a maximum speed. In this regard, the actuator 116 may variably affect the speed of the motive device between a stopped speed, which occurs when the actuator 116 is not depressed, and a maximum speed, which occurs when the actuator 116 is fully depressed.

Figure 2:
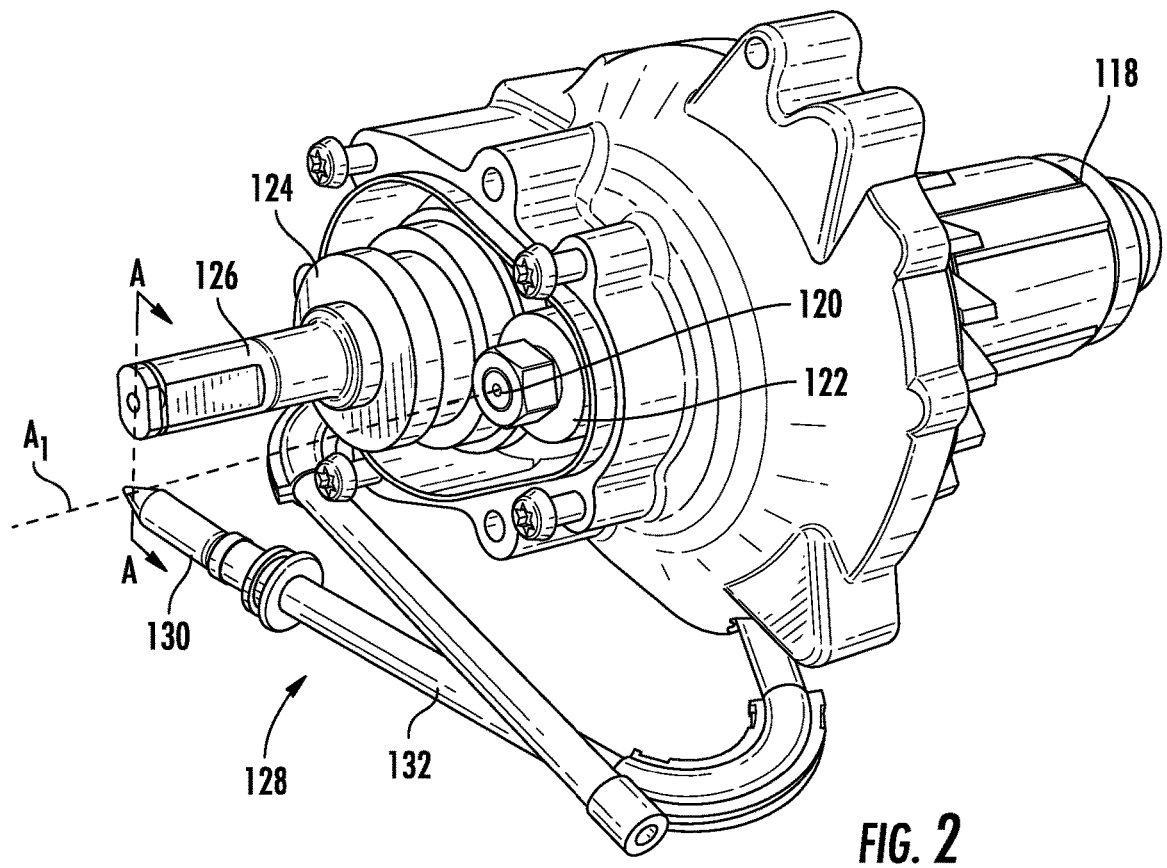
FIG. 2 is a perspective view of a portion of the chainsaw in accordance with embodiments of the present disclosure.

FIG. 2 depicts a perspective view of a portion of the chainsaw 100. In particular, FIG. 2 illustrates a view of a motive device 118. In the depicted embodiment, the motive device is an electric motor. The motive device 118 can be electrically coupled to the battery 114 to receive electrical energy therefrom. In another embodiment, the motive device 118 can be an engine, e.g., a gas-powered engine, in fluid communication with a gas tank.

A motive device shaft 120 can extend from the motive device 118. The motive device shaft 120 can be coupled to the motive device 118 and rotate about an axis of rotation $A_1$. A drive unit 122 can be coupled to the motive device shaft 120. The drive unit 122 can be configured to drive a driven unit 124. The driven unit 124 can include an output shaft 126. As the driven unit 124 is driven by the drive unit 122, the output shaft 126 can rotate. The output shaft 126 can be coupled with the aforementioned chain sprocket to drive the chain 104 (FIG. 1).

In certain instances, the chainsaw 100 can further include a lubricator 128 to provide lubricant to the chain 104. In an embodiment, the lubricator 128 can include a dispenser 130 where lubrication is introduced to an area adjacent to the chain 104. The dispenser 130 can be in fluid communication with a passageway 132 which connects the dispenser 130 with a lubricant reservoir (not illustrated). Lubricant can be biased to the dispenser 130 through the passageway 132 by a pump driven by, e.g., at least one of the motive device shaft 120 and the output shaft 126.

Figure 3:
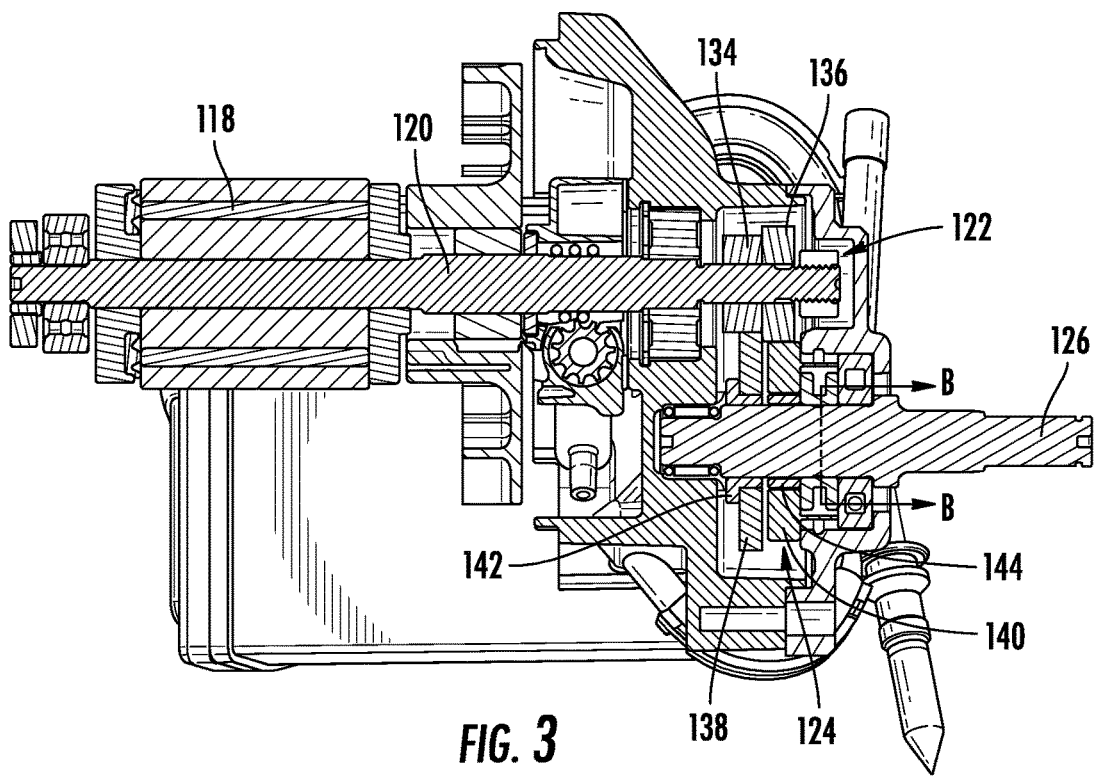
FIG. 3 is a cross-sectional side view of the portion of the chainsaw in accordance with embodiments of the present disclosure as seen along Line A-A in FIG. 2.
Figure 4:
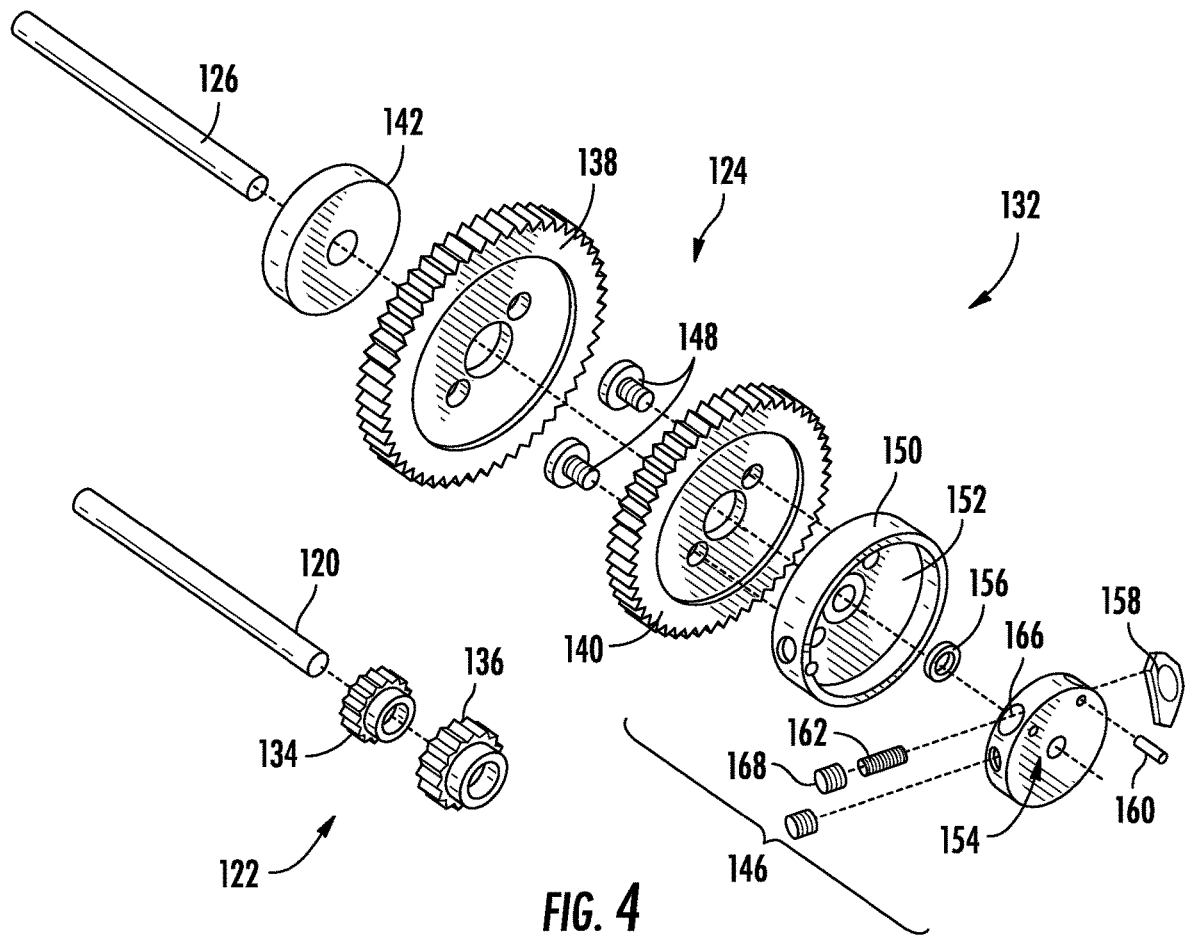
FIG. 4 is an exploded view of a transmission of the chainsaw in accordance with embodiments of the present disclosure.

FIG. 3 illustrates a cross-sectional side view as seen along Line A-A in FIG. 2. FIG. 4 illustrates an exploded view of an automatic transmission 132 of the chainsaw 100, including the aforementioned drive unit 122, the driven unit 124, the motive device shaft 120, and the drive shaft 126. The automatic transmission 132 is disposed between the motive device shaft 120 and the output shaft 126. The following description is made with respect to both FIGS. 3 and 4 unless stated to the contrary.

In an embodiment, the drive unit 122 can include a first drive gear 134 and a second drive gear 136. By way of example, the first and second drive gears 134 and 136 can be pinion gears including a plurality of radially extending teeth. The first and second drive gears 134 and 136 can be coupled to the motive device shaft 120. More particularly, the first and second drive gears 134 and 136 can be rotationally pinned to the motive device shaft 120 such that rotation of the motive device shaft 120 causes the same rotational displacement of the first and second drive gears 134 and 136. In an embodiment, the first and second drive gears 134 and 136 can have different sizes as compared to one another. For example, the first drive gear 134 can have a first number of teeth and the second drive gear 136 can have a second number of teeth different from the first number of teeth. The first number of teeth can be less than the second number of teeth. By way of non-limiting example, the first drive gear 134 can have 15 teeth and the second drive gear 136 can have 18 teeth.

The driven unit 124 can generally include a first driven gear 138 and a second driven gear 140. Each of the first and second driven gears 138 and 140 can have a plurality of radially extending teeth. The first driven gear 138 can be in communication with the first drive gear 134. For instance, the teeth of the first driven gear 138 can be in communication with the teeth of the first drive gear 134. Thus, the first drive gear 134 can rotate the first driven gear 138. The second driven gear 140 can be in communication with the second drive gear 136. For instance, the teeth of the second driven gear 140 can be in communication with the teeth of the second drive gear 136. Thus, the second drive gear 136 can rotate the second driven gear 140. The first and second driven gears 138 and 140 can be in communication with the output shaft 126. For example, each of the first and second driven gears 138 and 140 can include an aperture through which the output shaft 126 extends.

In an embodiment, a bearing 142 can be disposed between the first driven gear 138 and the output shaft 126. The bearing 142 can be a one-way bearing. In this regard, the bearing 142 can allow for relative rotation between the first driven gear 138 and the output shaft 126 in a first rotational direction while pinning together the first driven gear 138 and the output shaft 126 in a second rotational direction opposite the first rotational direction. The bearing 142 can include a roller bearing, a race with ball bearings or needle bearings, a fluid bearing, a journal bearing, or the like.

In an embodiment, a bearing 144 can be disposed between the second driven gear 140 and the output shaft 126. In an embodiment, the bearing 144 can be a multi-way bearing, allowing, e.g., free rotational movement between the output shaft 126 and the second driven gear 140 in either rotational direction.

The transmission 132 can further include a clutch 146. The clutch 146 can selectively couple the second driven gear 140 to the output shaft 126. In an embodiment, the clutch 146 can selectively couple the second driven gear 140 to the output shaft 126 upon the output shaft 126 reaching a preset rotational speed. Prior to reaching the preset rotational speed, the second driven gear 140 can move freely relative to the output shaft 126. By way of non-limiting example, the preset rotational speed can be 250 revolutions per minute (RPM), such as 500 RPM, such as 750 RPM, such as 1,000 RPM, such as 2,000 RPM, such as 5,000 RPM, such as 7,500 RPM, such as 10,000 RPM. In one or more embodiments, the preset rotational speed may be adjustable as described below. In other embodiments, the preset rotational speed may be fixed, i.e., non-adjustable.

The clutch 146 can be coupled with the second driven gear 140. For example, as depicted in FIG. 4, the clutch 146 can be statically coupled to the second driven gear 140 by fasteners 148. The clutch 146 can further be coupled to the output shaft 126. Thus, engagement, i.e., activation, of the clutch 146 can result in the second driven gear 140 being in an engaged relationship with the output shaft 126 through the clutch 146. In the engaged relationship, rotation of the output shaft 126 can be affected by rotation of the driven gear 140.

Referring to FIG. 4, the clutch 146 can generally include a clutch bell 150 configured to be coupled to the second driven gear 140 by the fasteners 148. The clutch bell 150 may thus always rotate with the second driven gear 140. The clutch bell 150 can define a volume 152 in which a clutch holder 154 can be disposed. The clutch holder 154 may be selectively rotatable with respect to the clutch bell 150. In this regard, relative movement between the output shaft 126 and clutch 146 can occur between the clutch bell 150 and the clutch holder 154. A bearing or washer 156 can be disposed between the clutch bell 150 and the clutch holder 154 to facilitate relative movement therebetween. The clutch holder 154 can hold a pawl 158. The pawl 158 can be coupled with the clutch holder 154 through a pivotable interface defined, e.g., by a pin 160. The pawl 158 can pivot about an axis formed by the pin 160. The pawl 158 can pivot between a disengaged position and an engaged position. In the disengaged position, the pawl 158 can allow for relative movement between the second driven gear 140 and the output shaft 126. Conversely, in the engaged position, the pawl 158 can rotatably pin the second driven gear 140 to the output shaft 126.

Figure 5:
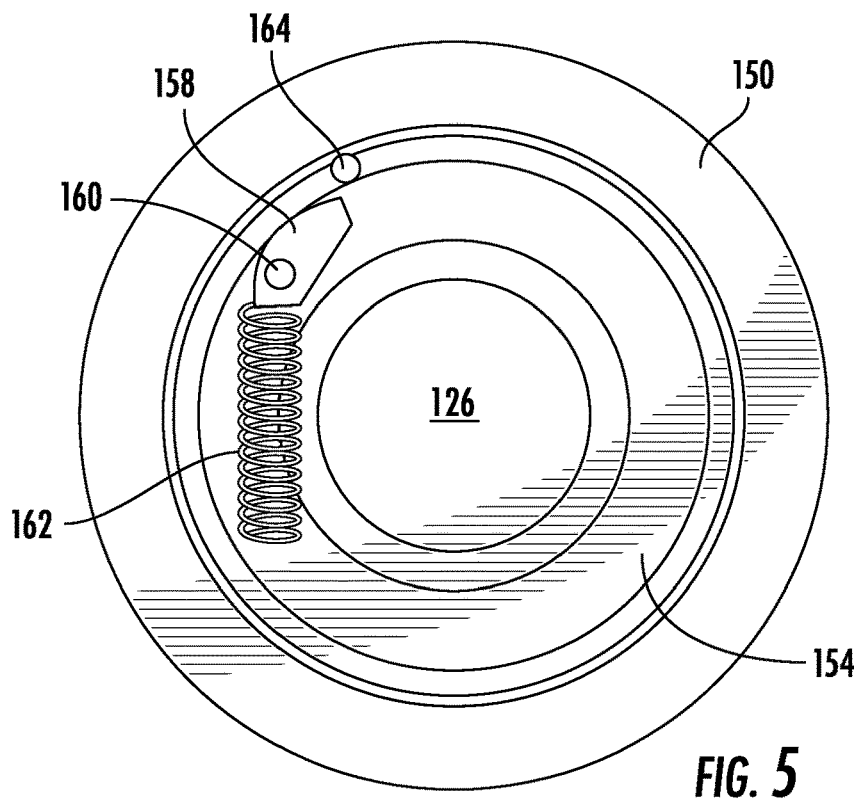
FIG. 5 is a cross-sectional view of a clutch of the transmission in accordance with embodiments of the present disclosure as seen along Line B-B in FIG. 4 when the clutch is in a first state.
Figure 6:
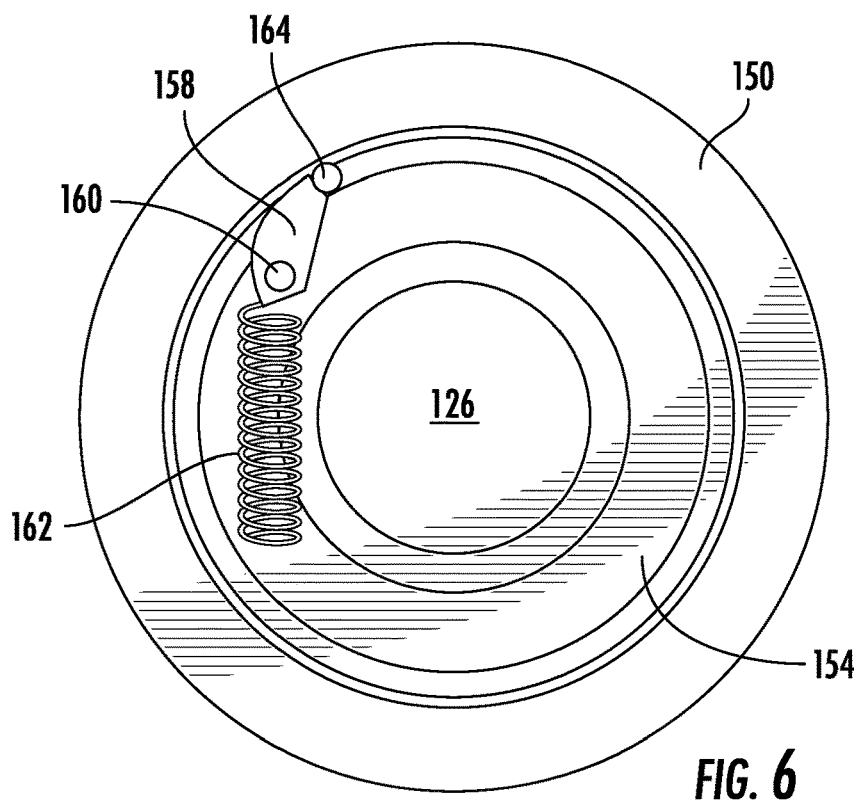
FIG. 6 is a cross-sectional view of a clutch of the transmission in accordance with embodiments of the present disclosure as seen along Line B-B in FIG. 4 when the clutch is in a second state.

FIGS. 5 and 6 depict cross-sectional views of the clutch 146 as seen along Line B-B in FIG. 3. The view depicted in FIG. 5 illustrates the clutch 146 in the disengaged position as seen prior to rotation of the output shaft 126 reaching the preset rotational speed. The view depicted in FIG. 6 illustrates the clutch 146 in the engaged position as seen when the rotational speed of the output shaft 126 exceeds the preset rotational speed.

Referring initially to FIG. 5, the pawl 158 can be biased to the disengaged position by a biasing element 162. The biasing element 162 can include a spring, such as a coil spring, which biases the pawl 158 about the axis formed by the pin 160. With the pawl 158 biased to the disengaged position, the clutch holder 154 can rotate with the output shaft 126 without the pawl 158 interfacing with a stop feature 164. The stop feature 164 can be coupled with the clutch bell 150. As long as the rotational speed of the output shaft 126 remains below the preset rotational speed, the clutch holder 154 can rotate with the pawl 158 passing by the stop feature 164 without interacting with the stop feature 164.

When the clutch 146 is not engaged, i.e., not activated, the second driven gear 140 may not affect rotation of the output shaft 126. Thus, the output shaft 126 can be rotatably driven by the first driven gear 138 when the clutch 146 is not engaged. The output shaft 126 can be driven by the first driven gear 138 until the output shaft 126 reaches the preset rotational speed, after which the output shaft 126 can be driven by the second driven gear 140.

Upon reaching the preset rotational speed, centripetal force on the pawl 158 can cause the pawl 158 to pivot a sufficient distance to interact, e.g., engage, the stop feature 164 as shown in FIG. 6. In this engaged position, the output shaft 126 becomes rotationally pinned to the clutch bell 150 which is fixed to the second driven gear 140. Thus, upon reaching the preset rotational speed using the first drive gear 134 driving the first driven gear 138, further increase in rotational speed is caused by the second drive gear 136 driving the second driven gear 140. When rotation of the output shaft 126 driven by the second driven gear 140, the first driven gear 140 can be overrun by the output shaft 126 because of the bearing 142. More particularly, once the rotational speed of the output shaft 126 exceeds the preset rotational speed, the bearing 142, e.g., the one-way bearing 142, can transition from a fixed coupler which transmits torque from the first drive gear 134 to the first driven gear 138 to a bearing which allows for rotation between the first drive gear 134 and the first driven gear 138.

The first drive gear 134 and first driven gear 138 can define a first gear ratio [$Teeth_{DRIVE1}/Teeth_{DRIVEN1}$]. The second drive gear 136 and second driven gear 140 can define a second gear ratio [$Teeth_{DRIVE2}/Teeth_{DRIVEN2}$]. In an embodiment, the first gear ratio can be different than the second gear ratio. More particularly, the first gear ratio can be less than the second gear ratio. By way of non-limiting example, the first gear ratio divided by the second gear ratio [($Teeth_{DRIVE1}/Teeth_{DRIVEN1}$)/($Teeth_{DRIVE2}/Teeth_{DRIVEN2}$)] can be less than 0.99, such as less than 0.95, such as less than 0.9, such as less than 0.85, such as less than 0.8, such as less than 0.75, such as less than 0.7, such as less than 0.65, such as less than 0.6, such as less than 0.55, such as less than 0.5. The difference between the first and second gear ratios can define an effective gearing of the transmission 132. The closer to 1.0 the resultant of dividing the first gear ratio by the second gear ratio, the less effective difference is created by the transmission 132 shifting. The closer to zero the resultant of dividing the first gear ratio by the second gear ratio, the larger the effective difference is created by the transmission 132 shifting. However, the closer to zero the resultant, the greater the amount of stress exhibited on the transmission 132 and motive device 118 during shifting. Moreover, the closer to zero the resultant, the less likely the transmission 132 can maintain a smooth shift as the rapid increase in rotational speed of the output shaft 126 as shifting occurs can bog down the motive device 118. Accordingly, in an embodiment, the first gear ratio divided by the second gear ratio [($Teeth_{DRIVE1}/Teeth_{DRIVEN1}$)/($Teeth_{DRIVE2}/Teeth_{DRIVEN2}$)] can be in a range between 0.65 and 0.85, and more particularly in a range between 0.7 and 0.8. In an embodiment, the first gear ratio divided by the second gear ratio [($Teeth_{DRIVE1}/Teeth_{DRIVEN1}$)/($Teeth_{DRIVE2}/Teeth_{DRIVEN2}$)] can be approximately 0.75. For example, the first drive gear 134 an have a size of 18, the first driven gear 138 can have a size of 35.2, the second drive gear 136 can have a size of 18.2, and the second driven gear 140 can have a size of 32.

Use of a multi-modal transmission 132 described herein can allow the chainsaw 100 to operate in a plurality of modes, such as a high-power mode and a high-speed mode. In the high-power mode, the chainsaw 100 may be able to cut through thick logs which might bog down the chainsaw 100 in the high-speed mode. In the high-speed mode, the chainsaw 100 may be able to more quickly cut through branches and other lighter, less dense materials. Because the transmission 132 can adjust between these modes automatically, the chainsaw 100 can automatically adapt to a current cutting operation without requiring the operator to preselect a mode prior to cutting. Thus, if the operator forgets to change the mode, the chainsaw 100 can continue to function using ideal settings.

Four tables are shown below. Table 1 shows an exemplary condition where the chainsaw 100 is operating without load, i.e., the chain 104 is freely moving without actively cutting into a material. Table 2 shows an exemplary condition where the chainsaw 100 is being used under light load conditions, e.g., to cut thin branches. Table 3 shows an exemplary condition where the chainsaw 100 is being used under medium load conditions, e.g., to cut thick branches. Table 4 shows an exemplary condition where the chainsaw 100 is being used under heavy load conditions, e.g., to cut thick logs. Data in all four tables is determined with the chainsaw 100 operating at maximum capacity under the described condition. For example, the data in table 1 is determined once the motive device 118 reaches a maximum operating speed of 20,000 RPM. Resistance caused by the load on the chain 104 in tables 2 through 4 slow down the motor, however, the motive device 118 is operating at maximum capacity in all four tables. The chainsaw 100 used to determine the data in all four tables had a first drive gear size of 15, a second drive gear size of 18.2, a first driven gear size of 35.2, and a second drive gear size of 32.

TABLE 1

NO LOAD

|  | First Drive Gear | Second Drive Gear | First Driven Gear | Second Driven Gear |
|---|---|---|---|---|
| Speed (RPM) | 20,000 | 20,000 | 8,522 | 11,375 |
| Torque (Nm) | 0.75 | 0.91 | 1.76 | 1.6 |
| Power (kW) | 1,571 | 1,906 | 1,571 | 1,906 |
| Status |  |  | Passive | Driving |

TABLE 2

LIGHT LOAD

|  | First Drive Gear | Second Drive Gear | First Driven Gear | Second Driven Gear |
|---|---|---|---|---|
| Speed (RPM) | 15,000 | 15,000 | 6,392 | 8,531 |
| Torque (Nm) | 6 | 7.28 | 14.08 | 12.8 |
| Power (kW) | 9,425 | 11,436 | 9,425 | 11,436 |
| Status |  |  | Passive | Driving |

TABLE 3

MEDIUM LOAD

|  | First Drive Gear | Second Drive Gear | First Driven Gear | Second Driven Gear |
|---|---|---|---|---|
| Speed (RPM) | 10,000 | 10,000 | 4,261 | 5,687 |
| Torque (Nm) | 15 | 18.2 | 35.2 | 32 |
| Power (kW) | 15,709 | 19,060 | 15,709 | 19,060 |
| Status |  |  | Driving | Passive |

TABLE 4

HEAVY LOAD

|  | First Drive Gear | Second Drive Gear | First Driven Gear | Second Driven Gear |
|---|---|---|---|---|
| Speed (RPM) | 5,000 | 5,000 | 2,131 | 2,844 |
| Torque (Nm) | 26.25 | 31.85 | 61.6 | 56 |
| Power (kW) | 13,745 | 16,677 | 13,745 | 16,677 |
| Status |  |  | Driving | Passive |

As shown in tables 1 and 2, the relatively higher gearing ratio associated with the second drive gear 136 and second driven gear 140 drives the output shaft 126 when the chainsaw 100 operates under no load and light load conditions. That is, the chainsaw 100 can operate at higher speeds when load conditions are nominal or light. This may be encountered for example, when cutting thin branches. Conversely, as shown in tables 3 and 4, the relatively lower gearing ratio associated with the first drive gear 134 and the first driven gear 138 drives the output shaft 126 when the chainsaw 100 operates under medium and high load conditions. The chainsaw 100 can operate at the lower gearing ratio when under medium and heavy loads to generate additional torque as shown in tables 3 and 4.

In certain embodiments, the clutch 146 may be adjustable. More particularly, the preset rotational speed of the clutch 146 may be adjustable. In this regard, the rotational speed at which the clutch 146 automatically shifts can be tuned. Referring again to FIG. 4, the spring 162 biasing the pawl 158 to the disengaged position can be tuned to change an effective spring force exhibited by the spring 162 on the pawl 158. The spring 162 can be disposed within an opening 166 in the clutch holder 154. An interface, such as a set screw 168, can engage with the opening 166 and be moved relative thereto. As the set screw 168 is translated into the opening 166, the spring 162 can exert additional force on the pawl 158, thereby increasing resistance to centripetal deployment. As the set screw 168 is translated out of the opening 166, the spring 162 can exert less force on the pawl 158, thus decreasing resistance to centripetal deployment. As centripetal force causes the pawl 158 to move from the disengaged position to the engaged position, adjusting the resistance to centripetal deployment effectively adjusts the speed at which the pawl 158 engages the stop feature 164 (FIGS. 5 and 6).

Further aspects of the invention are provided by one or more of the following embodiments:

Embodiment 1. A power tool comprising: a working implement; a motive device coupled to a motive device shaft; and an automatic transmission disposed between the working implement and the motive device to drive the working implement when the motive device is activated, the automatic transmission comprising: a drive unit comprising: a first drive gear coupled to the motive device shaft; and a second drive gear coupled to the motive device shaft; and a driven unit comprising: an output shaft in communication with the working implement; a first driven gear in communication with the first drive gear and the output shaft; a one-way bearing coupling the first driven gear to the output shaft; a second driven gear in communication with the second drive gear and the output shaft; and a clutch selectively coupling the second driven gear to the output shaft upon the output shaft reaching a preset rotational speed, wherein a first gear ratio [$\text{Teeth}_{DRIVE1}/\text{Teeth}_{DRIVEN1}$] of the first drive gear to the first driven gear is less than a second gear ratio [$\text{Teeth}_{DRIVE2}/\text{Teeth}_{DRIVEN2}$] of the second drive gear to the second driven gear.

Embodiment 2. The power tool of any one or more of the embodiments, further comprising a bearing disposed between the second driven gear and the output shaft such that rotational input to the second driven gear is communicated to the output shaft only through the clutch.

Embodiment 3. The power tool of any one or more of the embodiments, wherein the clutch is coupled directly to the second driven gear.

Embodiment 4. The power tool of any one or more of the embodiments, wherein the power tool comprises a chainsaw, wherein the working implement comprises a chain, and wherein the output shaft is coupled to a chain sprocket which drives the chain around a guide bar.

Embodiment 5. The power tool of any one or more of the embodiments, wherein the power tool comprises an automatic lubricator to provide lubricant to the working implement based on rotation of at least one of the motive device shaft or the output shaft.

Embodiment 6. The power tool of any one or more of the embodiments, wherein the preset rotational speed of the clutch is adjustable.

Embodiment 7. The power tool of any one or more of the embodiments, wherein the clutch comprises: a clutch bell coupled to the second driven gear; a clutch holder rotatably pinned to the output shaft; a pawl coupled to the clutch holder and configured to move between an engaged state and a disengaged state, wherein, in the engaged state, the clutch holder is rotatably pinned to the clutch bell, and wherein, in the disengaged state, the clutch holder is rotatable relative to the clutch bell; and a biasing element to bias the pawl to the disengaged state.

Embodiment 8. The power tool of any one or more of the embodiments, wherein the clutch bell comprises a stop feature, and wherein the pawl engages the stop feature when centripetal force caused by rotation of the output shaft exceeds the preset rotational speed.

Embodiment 9. The power tool of any one or more of the embodiments, wherein the one-way bearing allows for relative movement between the output shaft and the first driven gear when the output shaft is rotating faster than the first driven gear.

Embodiment 10. An automatic transmission for a chainsaw, the automatic transmission comprising: an output shaft configured to be coupled to a chain sprocket to rotatably drive the chain sprocket, wherein the automatic transmission is configured to automatically shift between a plurality of gear ratios in response to a rotational speed of the output shaft reaching a preset rotational speed.

Embodiment 11. The automatic transmission of any one or more of the embodiments, wherein the preset rotational speed is adjustable.

Embodiment 12. The automatic transmission of any one or more of the embodiments, wherein the automatic transmission further comprises: a drive unit comprising: a first drive gear coupled to a motive device shaft coupled to a motive device; and a second drive gear coupled to the motive device shaft; and a driven unit comprising: a first driven gear in communication with the first drive gear and the output shaft; a one-way bearing coupling the first driven gear to the output shaft; a second driven gear in communication with the second drive gear and the output shaft; and a clutch selectively coupling the second driven gear to the output shaft upon the output shaft reaching a preset rotational speed, wherein a first gear ratio [$Teeth_{DRIVE1}/Teeth_{DRIVEN1}$] of the first drive gear to the first driven gear is less than a second gear ratio [$Teeth_{DRIVE2}/Teeth_{DRIVEN2}$] of the second drive gear to the second driven gear.

Embodiment 13. The automatic transmission of any one or more of the embodiments, wherein the clutch is coupled directly to the second driven gear.

Embodiment 14. The automatic transmission of any one or more of the embodiments, wherein the first and second drive gears always rotate at a same relative speed as one another.

Embodiment 15. The automatic transmission of any one or more of the embodiments, wherein the automatic transmission further comprises a clutch, the clutch being a centrifugal clutch configured to shift between the plurality of gear ratios when a pawl of the centrifugal clutch pivots radially outward about a pivot point by a sufficient rotational displacement to engage a stop feature.

Embodiment 16. A chainsaw comprising: a guide bar; a chain disposed around the guide bar and moveable about the guide bar; a chain sprocket configured to drive the chain around the guide bar; a housing having a handle and an actuator; a motive device configured to drive the chain sprocket; and an automatic transmission disposed operatively between the motive device and the chain sprocket, the automatic transmission comprising: an output shaft coupled to the chain sprocket to rotatably drive the chain sprocket, wherein the automatic transmission is configured to automatically shift between a plurality of gear ratios in response to a rotational speed of the output shaft reaching a preset rotational speed.

Embodiment 17. The chainsaw of any one or more of the embodiments, wherein the preset rotational speed is adjustable.

Embodiment 18. The chainsaw of any one or more of the embodiments, wherein the automatic transmission further comprises: a drive unit comprising: a first drive gear coupled to a motive device shaft coupled to a motive device; and a second drive gear coupled to the motive device shaft; and a driven unit comprising: a first driven gear in communication with the first drive gear and the output shaft; a one-way bearing coupling the first driven gear to the output shaft; a second driven gear in communication with the second drive gear and the output shaft; and a clutch selectively coupling the second driven gear to the output shaft upon the output shaft reaching a preset rotational speed, wherein a first gear ratio [$Teeth_{DRIVE1}/Teeth_{DRIVEN1}$] of the first drive gear to the first driven gear is less than a second gear ratio [$Teeth_{DRIVE2}/Teeth_{DRIVEN2}$] of the second drive gear to the second driven gear.

Embodiment 19. The chainsaw of any one or more of the embodiments, wherein the clutch comprises: a clutch bell coupled to the second driven gear; a clutch holder rotatably pinned to the output shaft; a pawl coupled to the clutch holder and configured to move between an engaged state and a disengaged state, wherein, in the engaged state, the clutch holder is rotatably pinned to the clutch bell, and wherein, in the disengaged state, the clutch holder is rotatable relative to the clutch bell; and a biasing element to bias the pawl to the disengaged state Embodiment 20. The chainsaw of any one or more of the embodiments, wherein the power tool comprises an automatic lubricator to provide lubricant to the working implement based on rotation of at least one of the motive device shaft or the output shaft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A power tool comprising:
a working implement;
a motive device coupled to a motive device shaft; and
an automatic transmission disposed between the working implement and the motive device to drive the working implement when the motive device is activated, the automatic transmission comprising:
a drive unit comprising:
a first drive gear coupled to the motive device shaft; and
a second drive gear coupled to the motive device shaft; and
a driven unit comprising:

an output shaft in communication with the working implement;
a first driven gear in communication with the first drive gear and the output shaft;
a one-way bearing coupling the first driven gear to the output shaft;
a second driven gear in communication with the second drive gear and the output shaft;
a clutch selectively coupling the second driven gear to the output shaft upon the output shaft reaching a preset rotational speed; and
a bearing disposed between the second driven gear and the output shaft such that rotational input to the second driven gear is communicated to the output shaft only through the clutch,
wherein a first gear ratio [Teeth$_{DRIVE1}$/Teeth$_{DRIVEN1}$] of the first drive gear to the first driven gear is less than a second gear ratio [Teeth$_{DRIVE2}$/Teeth$_{DRIVEN2}$] of the second drive gear to the second driven gear.

2. The power tool of claim 1, wherein the clutch selectively couples the first driven gear to the output shaft upon the clutch falling below the preset rotational speed.

3. The power tool of claim 1, wherein the clutch is coupled directly to the second driven gear.

4. The power tool of claim 1, wherein the power tool comprises a chainsaw, wherein the working implement comprises a chain, and wherein the output shaft is coupled to a chain sprocket which drives the chain around a guide bar.

5. The power tool of claim 1, wherein the power tool comprises an automatic lubricator to provide lubricant to the working implement based on rotation of at least one of the motive device shaft or the output shaft.

6. The power tool of claim 1, wherein the preset rotational speed of the clutch is adjustable.

7. The power tool of claim 1, wherein the clutch comprises:
a clutch bell coupled to the second driven gear;
a clutch holder rotatably pinned to the output shaft;
a pawl coupled to the clutch holder and configured to move between an engaged state and a disengaged state, wherein, in the engaged state, the clutch holder is rotatably pinned to the clutch bell, and wherein, in the disengaged state, the clutch holder is rotatable relative to the clutch bell; and
a biasing element to bias the pawl to the disengaged state.

8. The power tool of claim 7, wherein the clutch bell comprises a stop feature, and wherein the pawl engages the stop feature when centripetal force caused by rotation of the output shaft exceeds the preset rotational speed.

9. The power tool of claim 1, wherein the one-way bearing allows for relative movement between the output shaft and the first driven gear when the output shaft is rotating faster than the first driven gear.

10. An automatic transmission for a chainsaw, the automatic transmission comprising:
an output shaft configured to be coupled to a chain sprocket to rotatably drive the chain sprocket; and
a centrifugal clutch configured to shift between a plurality of gear ratios when a pawl of the centrifugal clutch pivots radially outward about a pivot point by a sufficient rotational displacement to engage a stop feature,
wherein the automatic transmission is configured to automatically shift between the plurality of gear ratios in response to a rotational speed of the output shaft reaching a preset rotational speed.

11. The automatic transmission of claim 10, wherein the preset rotational speed is adjustable.

12. The automatic transmission of claim 10, wherein the automatic transmission further comprises:
a drive unit comprising:
a first drive gear coupled to a motive device shaft coupled to a motive device; and
a second drive gear coupled to the motive device shaft; and
a driven unit comprising:
a first driven gear in communication with the first drive gear and the output shaft;
a one-way bearing coupling the first driven gear to the output shaft;
a second driven gear in communication with the second drive gear and the output shaft; and
a clutch selectively coupling the second driven gear to the output shaft upon the output shaft reaching a preset rotational speed,
wherein a first gear ratio [Teeth$_{DRIVE1}$/Teeth$_{DRIVEN1}$] of the first drive gear to the first driven gear is less than a second gear ratio [Teeth$_{DRIVE2}$/Teeth$_{DRIVEN2}$] of the second drive gear to the second driven gear.

13. The automatic transmission of claim 12, wherein the centrifugal clutch is coupled directly to the second driven gear.

14. The automatic transmission of claim 12, wherein the first and second drive gears always rotate at a same relative speed as one another.

15. The automatic transmission of claim 10, wherein the automatic transmission is configured to automatically shift between the plurality of gears in response to the rotational speed of the output shaft falling below the preset rotational speed.

16. A chainsaw comprising:
a guide bar;
a chain disposed around the guide bar and moveable about the guide bar;
a chain sprocket configured to drive the chain around the guide bar;
a housing having a handle and an actuator;
a motive device configured to drive the chain sprocket;
an automatic transmission disposed operatively between the motive device and the chain sprocket, the automatic transmission comprising:
an output shaft coupled to the chain sprocket to rotatably drive the chain sprocket,
wherein the automatic transmission is configured to automatically shift between a plurality of gear ratios in response to a rotational speed of the output shaft reaching a preset rotational speed; and
an automatic lubricator to provide lubricant to the chain based on rotation of at least one of the motive device or the output shaft.

17. The chainsaw of claim 16, wherein the preset rotational speed is adjustable.

18. The chainsaw of claim 16, wherein the automatic transmission further comprises:
a drive unit comprising:
a first drive gear coupled to a motive device shaft coupled to a motive device; and
a second drive gear coupled to the motive device shaft; and
a driven unit comprising:
a first driven gear in communication with the first drive gear and the output shaft;

a one-way bearing coupling the first driven gear to the output shaft;

a second driven gear in communication with the second drive gear and the output shaft; and a clutch selectively coupling the second driven gear to the output shaft upon the output shaft reaching a preset rotational speed, wherein a first gear ratio [$\text{Teeth}_{DRIVE1}/\text{Teeth}_{DRIVEN1}$] of the first drive gear to the first driven gear is less than a second gear ratio [$\text{Teeth}_{DRIVE2}/\text{Teeth}_{DRIVEN2}$] of the second drive gear to the second driven gear.

19. The chainsaw of claim 18, wherein the clutch comprises:

a clutch bell coupled to the second driven gear;

a clutch holder rotatably pinned to the output shaft;

a pawl coupled to the clutch holder and configured to move between an engaged state and a disengaged state, wherein, in the engaged state, the clutch holder is rotatably pinned to the clutch bell, and wherein, in the disengaged state, the clutch holder is rotatable relative to the clutch bell; and a biasing element to bias the pawl to the disengaged state.

20. The chainsaw of claim 16, wherein the clutch selectively couples the first driven gear to the output shaft upon the clutch falling below the preset rotational speed.

* * * * *